May 15, 1923.

J. BLATECKY

PLANTING MACHINE

Filed June 7, 1921

1,454,949

4 Sheets-Sheet 3

Inventor
J. Blatecky

By J. K. Bryant

Attorney

May 15, 1923.

J. BLATECKÝ

PLANTING MACHINE

Filed June 7, 1921

1,454,949

4 Sheets-Sheet 4

Inventor
J. Blatecký
By J.K. Bryant
Attorney

Patented May 15, 1923.

1,454,949

UNITED STATES PATENT OFFICE.

JOE BLATECKÝ, OF RACINE, WISCONSIN.

PLANTING MACHINE.

Application filed June 7, 1921. Serial No. 475,753.

*To all whom it may concern:*

Be it known that I, JOE BLATECKÝ, a citizen of Czechoslovakia, residing at Racine, in the county of Racine and State of Wisconsin, have invented certain new and useful Improvements in Planting Machines, of which the following is a specification.

This invention relates to certain new and useful improvements in planting machines adaptable for planting various forms of vegetables such as beets, potatoes and the like.

The primary object of the invention is to provide an improved mechanism for simultaneously intermittently delivering vegetable seeds combined with a small quantity of fertilizer into a suitable furrow previously formed for reception of the same.

Another object of the invention is to adapt such mechanism for use upon large farms wherein the fertilizer and seed delivering mechanism embodies a plurality of delivery tubes in tandem arrangement and wherein means is associated with each tube for intermittently feeding fertilizer and seed simultaneously thereto.

With the above general objects in view and others that will become apparent as the nature of the invention is better understood, the same consists of the novel form, combination and arrangement of parts hereinafter more fully described, shown in the accompanying drawings and claimed.

Figure 1:
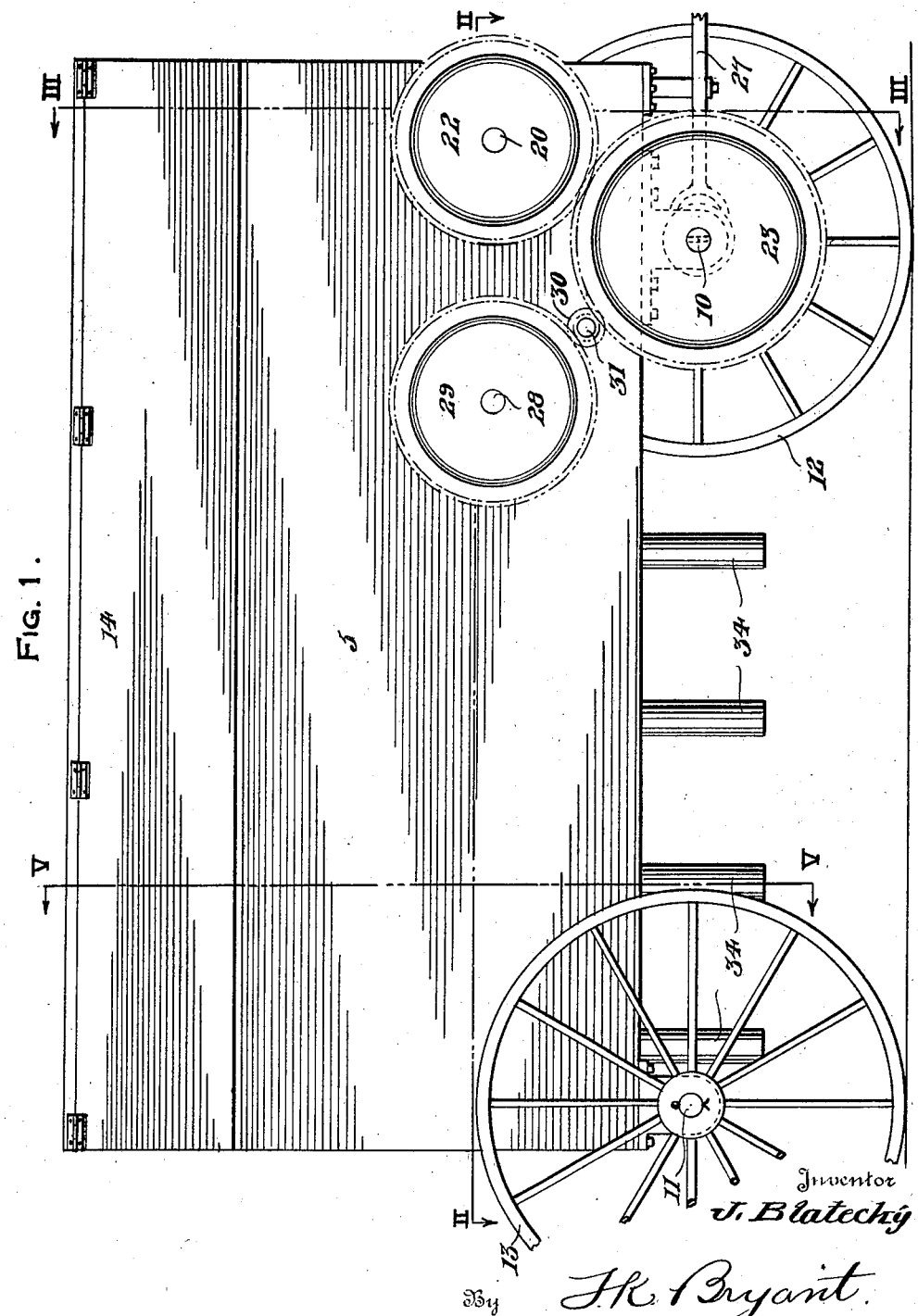
Figure 2:
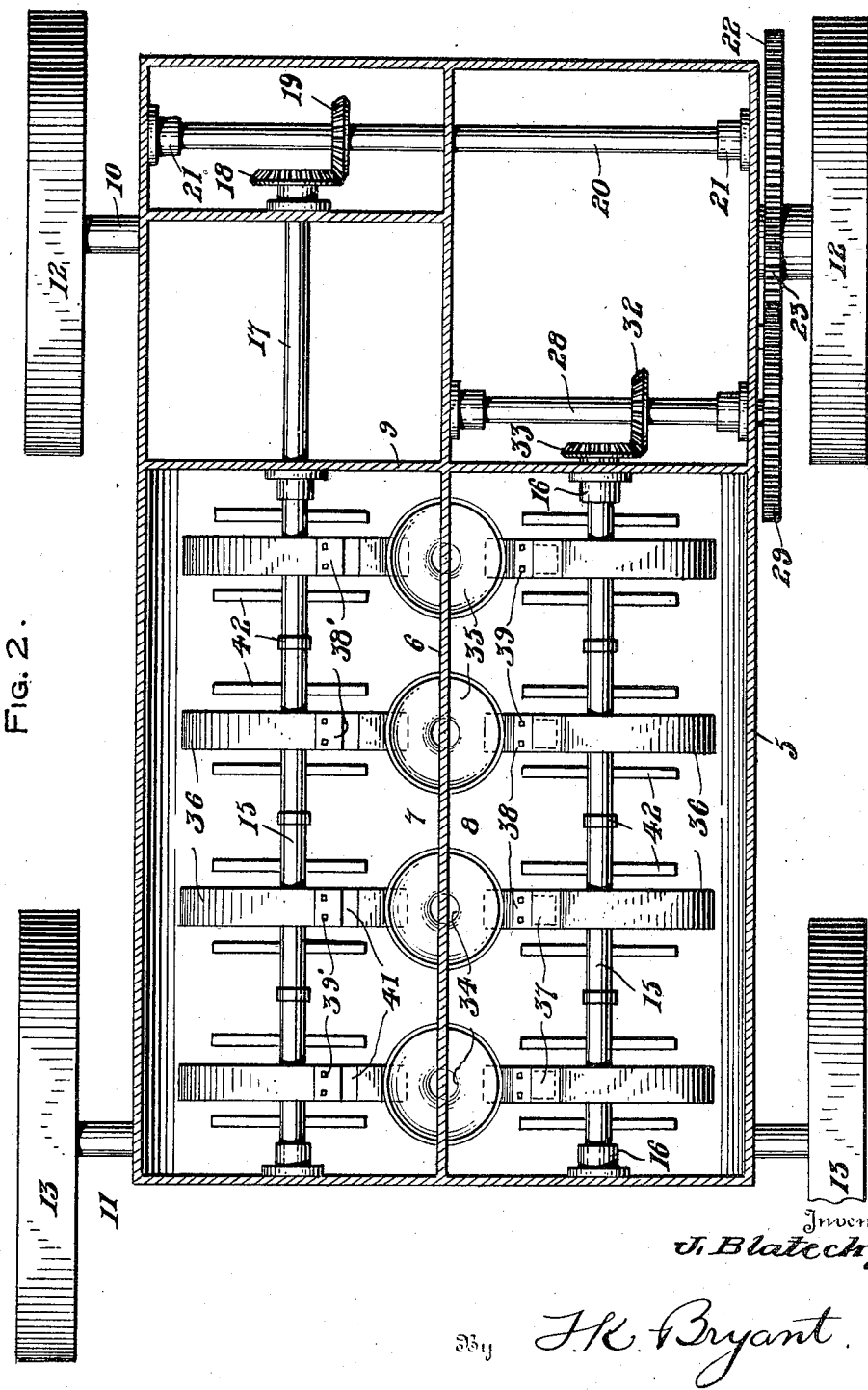
Figure 3:
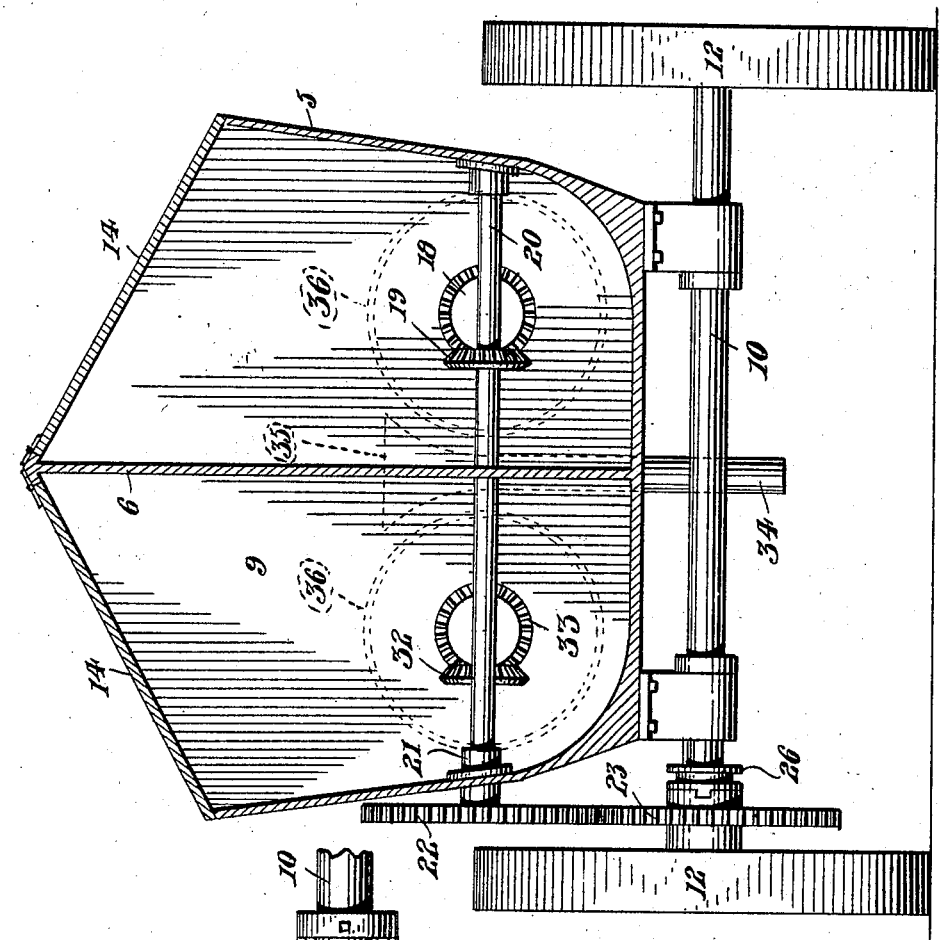
Figure 4:
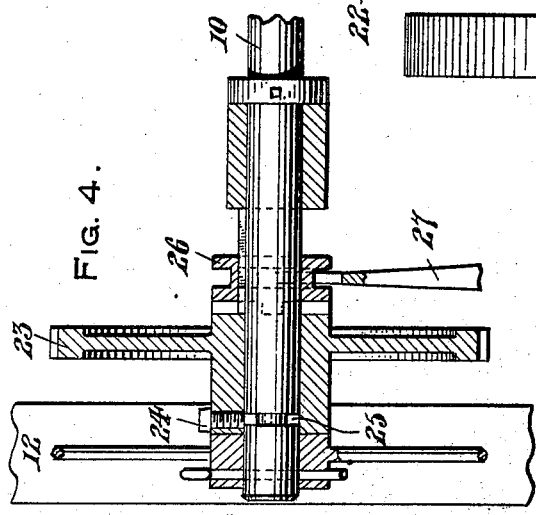
Figure 5:
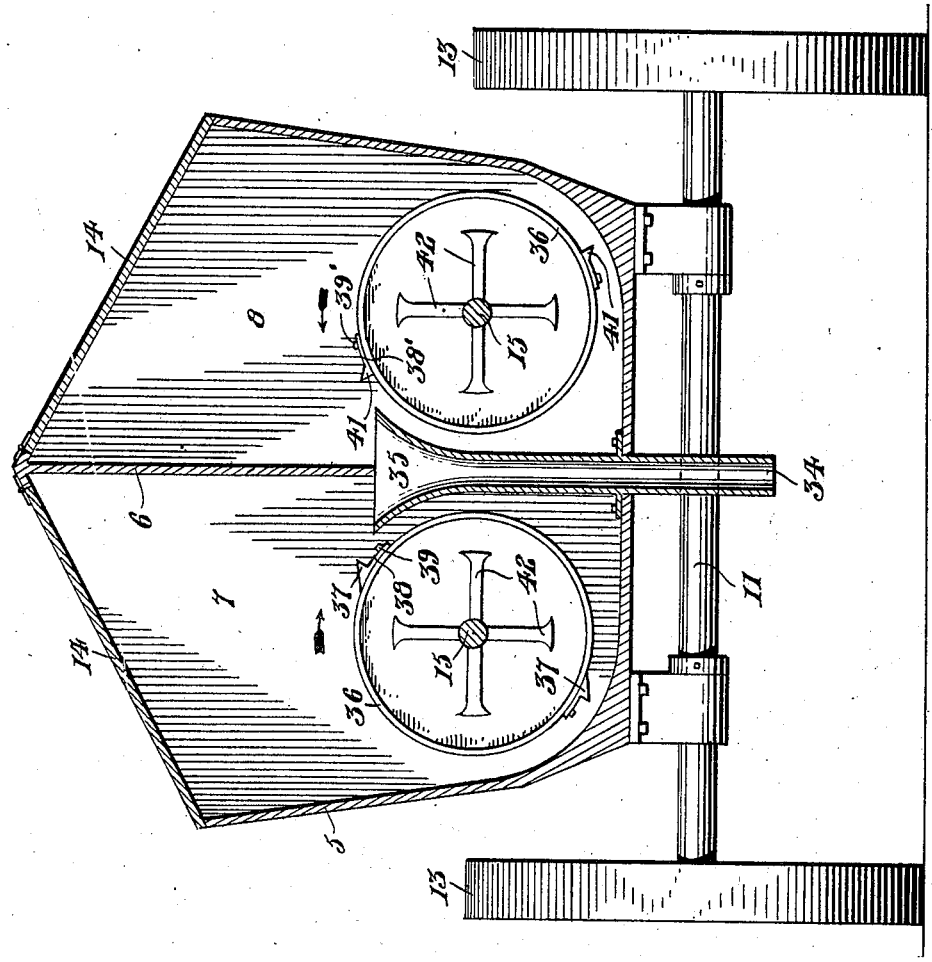
Figure 6:
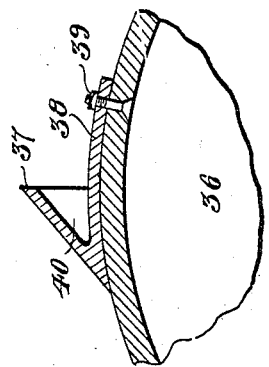
Figure 7:
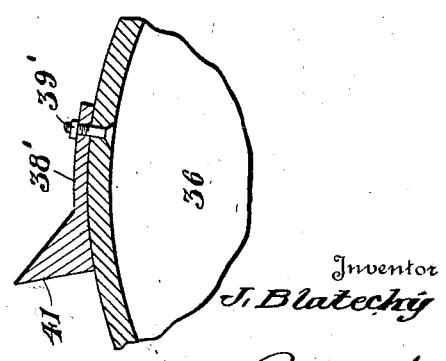

In the drawings, wherein like reference characters designate corresponding parts throughout the several views, Figure 1 is a side elevational view of a planting machine constructed in accordance with the present invention, partly broken away, Figure 2 is a horizontal sectional view taken upon line II—II of Fig. 1, Figure 3 is a vertical sectional view taken upon line III—III of Fig. 1, Figure 4 is an enlarged fragmentary sectional view showing the clutch means for rendering the fertilizer and seed delivering mechanism inoperative, Figure 5 is a vertical sectional view taken upon line V—V of Fig. 1, Figure 6 is a fragmentary sectional view of one of the feed wheels, and Figure 7 is a similar view showing a modified form of said wheel.

Referring more in detail to the several views, the present invention embodies a body 5 in the nature of a large receptacle divided by a longitudinal central vertical partition 6 into a pair of compartments 7 and 8 and by a transverse partition 9, the front portion of the body is separated from the compartments 7 and 8 to accommodate shafting and gearing as will presently become apparent.

The body 5 is provided with front and rear axles 10 and 11 respectively having supporting wheels 12 and 13 so that the device may be drawn parallel with a furrow suitably formed in the ground, and the top of the body is covered by a pair of hinged closures 14 which preferably slope from the central partition 6 downwardly and outwardly to the sides of the body as shown in Figs. 3 and 5.

In each of the compartments 7 and 8 a shaft 15 is centrally and longitudinally arranged, such shaft being journaled in suitable bearings 16, and one of the shafts being extended forwardly a greater distance than the other as at 17. This longer shaft has a bevel gear 18 fixed upon the forward end thereof and meshing with another bevel gear 19 fixed upon a transverse shaft 20 which is journaled in suitable bearings 21 just behind the forward end of the body 5. One end of the shaft 20 projects through a side of the body 5 and has a large spur gear 22 fixed thereon so as to mesh with another large spur gear 23 which is loosely mounted upon the adjacent end portion of the axle 10 inwardly of the adjacent supporting wheel 21, the gear 23 being held against endwise movement by means of a screw 24 which is threaded through the hub of said gear and which projects into an annular groove 25 provided in said axle 10. A slidable clutch member is keyed upon the axle 10 as at 26 and has teeth for engaging corresponding clutch teeth on the hub of the gear 23 whereby said gear may be clutched or unclutched from said axle 10 at will, a lever 27 being associated with the clutch member 26 for operating the same.

A short shaft 28 is journaled between the partition 6 and one side of the body 5 rearwardly of the shaft 20 and transversely of the body, and one end of this shaft projects through said side of the body and has a large spur gear 29 fixed thereon so as to mesh with a spur pinion 30 which is suitably journaled upon a stub shaft 31 fixed to the body. The pinion 30 also meshes with the large spur gear 23, and the shaft 28 has a bevel gear 32 fixed thereon and meshing with another bevel gear 33 secured upon the forward end of the shorter shaft 15.

The central longitudinal partition 6 is cut away at intervals for snugly accommodating a plurality of delivery tubes 34 which are disposed vertically and which are of such length as to extend from a point some distance above the bottom of the body 5 to a point some distance below said bottom of the body as shown in Fig. 5, suitable holes being provided in said bottom through which the tubes project. The delivery tubes 34 have enlarged or flared upper ends as at 35 which communicate with both of the compartments 7 and 8, and the tubes 34 are arranged in tandem relation as clearly shown in Fig. 2.

In the use of the apparatus, one of the compartments 7 or 8 is adapted to be partially filled with a suitable fertilizer while the other is to be partially filled with the seed to be planted, and means is provided upon the shafts 15 for intermittently and simultaneously delivering small quantities of fertilizer and seed to each of the tubes 34 and to agitate the seeds and the fertilizer so as to keep the same uniformly distributed and loosened in said compartments 7 and 8. As the means for delivering the fertilizer is identical with that for delivering the seed, description of one of the same will suffice. Upon each shaft 15 is secured a plurality of wheels 36, each of which are disposed at one side of a tube 34 and each wheel 36 has a plurality of projections 37 at suitable intervals on the periphery of the same formed so as to engage and elevate a small quantity of material at a time and deliver the same into the flared upper end of the adjacent tube 34 as the shafts 15 are rotated. In the preferred construction of these projections as shown in Fig. 6, the same consists of a plate 38 bolted as at 39 to the wheel 36 and formed with a laterally projecting portion with a pocket 40 therein. However, as shown in Fig. 7, this material lifting element may be simply constructed of a plate portion 38′ bolted as at 39′ to the wheel 36 and with the laterally projecting portion solid as at 41, depending upon the character of the material being handled. At opposite sides of each of the wheels 36 is fixed a stirrer 42 each of which embodies a plurality of radially extending arms fixed to each of the shafts 15 and of such length as to engage the seeds or fertilizer and agitate the same for keeping it in a loose evenly distributed condition within the compartments.

In operation, the vehicle is moved forwardly in any suitable manner so as to be drawn by a tractor or the like so that the tube 34 overlie a furrow which has been previously formed, thereby causing rotation of the spur gear 23 upon engagement of the clutch member 26 with the teeth on the hub of said gear 23, and through the gearing described, the shafts 15 are rotated in opposite directions as indicated by the arrows in Fig. 5. In this manner small quantities of fertilizer and seed are simultaneously intermittently elevated and fed into the flared upper ends of the delivery tubes 34. The fertilizer and seed are fed by gravity through the tubes 34 into the furrow and in this manner a considerable area of ground may be quickly planted, the furrow being covered in any usual manner after deposit of the seeds and fertilizer.

It is to be understood that means for steering the vehicle such as employ stub axles or the like may be readily embodied in the invention without exercise of invention, but as such details do not enter into the present invention, the same are not shown.

From the foregoing description it is believed that the construction and operation as well as the advantages of the present invention will be readily understood and appreciated by those skilled in the art from the foregoing description.

Minor changes may be made in the invention without departing from the spirit and scope thereof as claimed.

What is claimed as new is:—

1. In a planting machine, an upright delivery tube, a receptacle in which said tube is substantially centrally mounted, a partition in the receptacle dividing the same into non-communicating compartments arranged side by side with the upper end of the said tube being outwardly flared and communicating with both of said compartments, and means for delivering material from each of said compartments intermittently and simultaneously into the upper end of said tube.

2. In a planting machine, a receptacle divided into side compartments by a longitudinal partition wall having spaced vertical openings therein, a plurality of delivery tubes centrally disposed within the receptacles and in tandem relation, the upper open ends of said tubes being flared and having communication with each compartment, a longitudinal shaft within each compartment, a plurality of material elevating wheels on each shaft, each arranged beside a delivery tube, and stirrers fixed upon said shafts at opposite sides of said wheels.

In testimony whereof I affix my signature in presence of two witnesses.

JOE BLATECKÝ.

Witnesses:
ANTON BUSDA,
JOHN KANÉCNÝ.